United States Patent
Sanders et al.

(10) Patent No.: US 10,137,942 B2
(45) Date of Patent: Nov. 27, 2018

(54) SHEET METAL WORKPIECE

(71) Applicant: GM GLOBAL TECHNOLOGY OPERATIONS LLC, Detroit, MI (US)

(72) Inventors: Ronald Sanders, Ruesselsheim (DE); Wolfgang Eberlein, Ruesselsheim (DE); Maurice Dietz, Ruesselsheim (DE); Hartmut Baumgart, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/422,630

(22) Filed: Feb. 2, 2017

(65) Prior Publication Data
US 2017/0225720 A1    Aug. 10, 2017

(30) Foreign Application Priority Data
Feb. 4, 2016 (DE) ................. 10 2016 001 229

(51) Int. Cl.
| | |
|---|---|
| *B62D 29/00* | (2006.01) |
| *B62D 25/12* | (2006.01) |
| *B62D 27/02* | (2006.01) |
| *B62D 29/04* | (2006.01) |
| *B62D 43/06* | (2006.01) |
| *B21C 37/00* | (2006.01) |
| *B62D 25/00* | (2006.01) |

(Continued)

(52) U.S. Cl.
CPC ............ *B62D 29/005* (2013.01); *B21C 37/00* (2013.01); *B62D 25/00* (2013.01); *B62D 25/105* (2013.01); *B62D 25/12* (2013.01); *B62D 27/026* (2013.01); *B62D 29/007* (2013.01); *B62D 29/008* (2013.01); *B62D 29/04* (2013.01); *B62D 43/06* (2013.01); *B62D 43/10* (2013.01); *C21D 6/00* (2013.01); *B60Y 2304/03* (2013.01); *B60Y 2410/121* (2013.01); *B60Y 2410/124* (2013.01)

(58) Field of Classification Search
CPC ...... B62D 29/005; B62D 29/007; B21C 37/00
USPC .......... 52/573.1; 438/118; 296/37.2; 428/118
See application file for complete search history.

(56) References Cited

U.S. PATENT DOCUMENTS

| | | | | | |
|---|---|---|---|---|---|
| 3,485,596 | A | * | 12/1969 | Alleaume Jean ...... | B21D 51/24 220/560.06 |
| 4,649,607 | A | * | 3/1987 | Kuhn, II .............. | B21D 31/043 29/6.1 |

(Continued)

FOREIGN PATENT DOCUMENTS

| | | |
|---|---|---|
| DE | 102004031240 A1 | 3/2005 |
| DE | 202012000616 U1 | 4/2012 |
| KR | 20130102493 A | 9/2013 |

OTHER PUBLICATIONS

German Patent Office, German Search Report for German Application No. 102016001229.3, dated Jan. 19, 2017.

(Continued)

*Primary Examiner* — Dennis H Pedder
(74) *Attorney, Agent, or Firm* — Lorenz & Kopf, LLP

(57) ABSTRACT

A workpiece includes a plurality of knots and webs, which are formed in one piece, of a sheet metal, in particular a steel plate. Each web extends between two openings from one knot to another knot, and at least three webs meet at each knot. A plurality of the webs has a cross section, which includes at least one hardened and one unhardened area.

20 Claims, 3 Drawing Sheets

(51) Int. Cl.
*B62D 25/10* (2006.01)
*B62D 43/10* (2006.01)
*C21D 6/00* (2006.01)

(56) References Cited

U.S. PATENT DOCUMENTS

| | | | |
|---|---|---|---|
| 5,763,045 A * | 6/1998 | Menzel | B32B 3/266 428/131 |
| 6,205,713 B1 * | 3/2001 | Thompson | E06B 9/02 49/465 |
| 6,364,973 B1 | 4/2002 | Golle et al. | |
| 2003/0102687 A1 * | 6/2003 | McLeod | B29C 70/467 296/37.2 |
| 2006/0097549 A1 | 5/2006 | Fischer et al. | |
| 2012/0180911 A1 | 7/2012 | Bartolomucci et al. | |
| 2015/0345004 A1 | 12/2015 | Sanders et al. | |
| 2016/0017457 A1 | 1/2016 | Baumgart et al. | |

OTHER PUBLICATIONS

Great Britain Patent Office, Great Britain Search Report for Great Britain Application No. 1701371.5, dated Jun. 9, 2017.

* cited by examiner

Fig. 9
Fig. 10
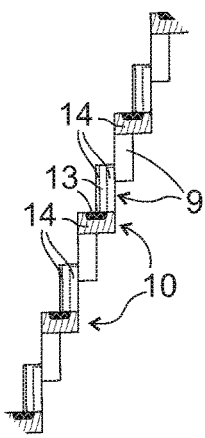
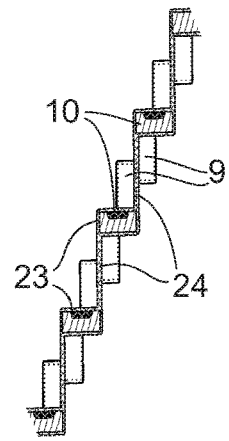
Fig. 11
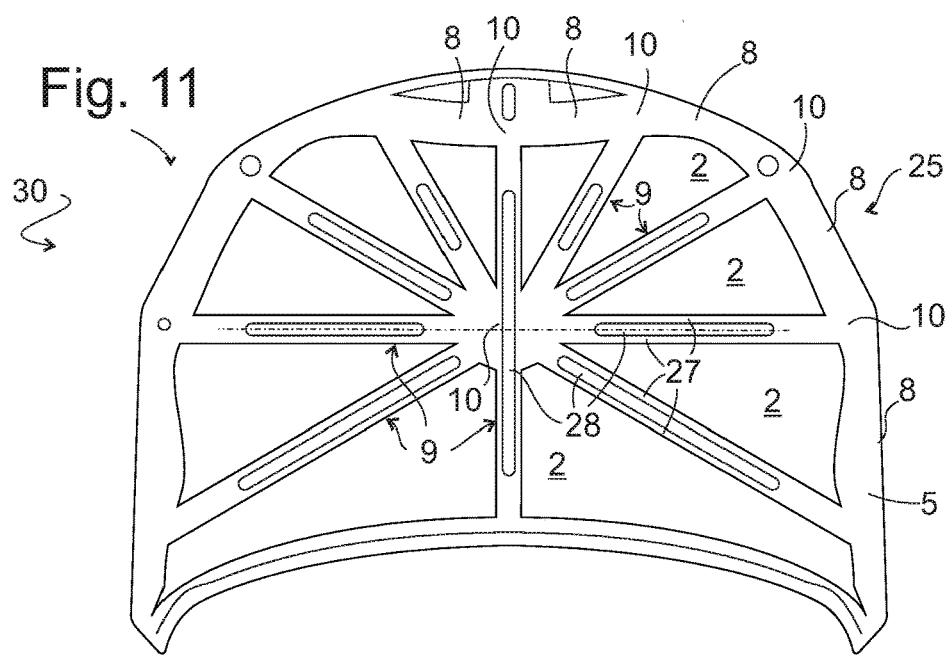
Fig. 12
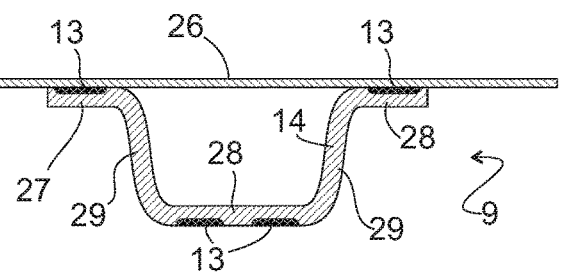

SHEET METAL WORKPIECE

CROSS-REFERENCE TO RELATED APPLICATION

This application claims priority to German Patent Application No. DE102016001229.3, filed Feb. 4, 2016, which is incorporated herein by reference in its entirety.

TECHNICAL FIELD

The present disclosure pertains to a workpiece of sheet metal, in particular steel plate, which can be used in vehicle construction, among others.

BACKGROUND

Ever-stricter requirements for the protection of vehicle passengers and other road users place conflicting demands on the developers of motor vehicle bodies. On the one hand, a high dimensional stability of the body is required for the passenger protection, and on the other hand, the body is to also be flexible in order to minimize the risk of injury to road users outside of the vehicle in the event of an accident. In addition, these demands are to be fulfilled with a weight of the body, which is as light as possible, so as to be able to also attain a minimization of the fuel consumption at the same time.

Sheet metal workpieces with locally variable thickness, so-called tailored blanks, which are obtained, e.g. by butt welding sheet metal of different thicknesses or by welding or adhering reinforcements to a substrate sheet metal, is a known technology, which is used in an attempt to meet these demands. A weight minimization is possible here in that the wall thickness of the tailored blanks is adapted exactly to the load distribution in the later finished workpiece and in that highly loaded areas receive a high wall thickness and lightly loaded areas receive a small wall thickness.

One disadvantage of this technology is that it requires the production and assembling of various individual parts. In particular, the welding together of the individual parts takes considerable time, because the spots to be welded by a welding tool must be reached and treated one after the other, and because the effort associated with the production and assembling of the individual parts becomes larger, the more exactly the shape and/or number thereof is adapted to the load distribution in the finished workpiece.

SUMMARY

According to the present disclosure, a workpiece may be made of sheet metal, having a loadability which can be adapted locally, similarly to that of a tailored blank, but which provides local weakening or reinforcement, respectively, of areas of the workpiece, without a detailed structure of these areas increasing the production effort.

According to an embodiment of the present disclosure, a workpiece includes a plurality of knots and webs, which are formed in one piece, of a sheet metal, in particular a steel plate. Each web extends between two openings from one knot to another knot, and at least three webs meet at each knot. A plurality of the webs has a cross section which includes at least one hardened and one unhardened area. A local weakening of the sheet metal used as base material is thus possible by punching out the openings, as well as a reinforcement by creating the hardened areas, in particular by the methods known from DE 10 2014 010 660 A1 or DE 10 2014 009 716 A1. The effort needed for the weakening or reinforcement, respectively, only depends on the size of the sheet metal surface to be treated, but not on the richness of detail of the structures created thereon.

To ensure a high loadabiity, the hardened areas of the webs, which meet at a knot, are to also meet at the knot. The hardened areas are to in particular form a grid, in each of the meshes of which openings are located. The unhardened area can occupy at least one edge area of each web adjoining the openings. In particular a hardened area in the form of a layer, which adjoins the surface of the web, can be created economically by the above-mentioned methods. A particularly high bending stiffness can be reached, when the hardened area forms two layers on opposite surfaces of the web.

The hardened area is preferably formed by alloying a hardening addition into the sheet metal. The sheet metal of the workpiece can be formed three-dimensionally. Even though the hardening addition can have already been applied to the workpiece prior to the molding, the alloying of the hardening addition advantageously occurs only during the molding or thereafter.

For some uses, it may be advantageous for the webs and knots to be arranged in a periodic grid. In the case of such a workpiece, the positions of the openings and of the hardened areas can also be adapted specifically to the load distribution in the finished workpiece; however, this is not mandatory.

To minimize the weight of the workpiece, the openings should occupy at least half of the surface of the sheet metal. If this is required, the openings can be closed by a non-metallic skin, in particular made of a plastic for keeping away precipitation, dirt or the like. For the sake of stability and simple production it is preferred for the skin to furthermore extend across at least one surface of the knots and webs. Such a continuous skin can be obtained, e.g. by adhesion or lamination of a film on one or two sides of the workpiece or also by immersing the workpiece into a melt. Such a plastic skin is preferred in particular in the case of workpieces, which are not visible from the outside or which are used inconspicuously in the interior of a vehicle body, e.g. as spare wheel recess.

In the alternative, the openings can also be covered by a second sheet metal, which is supported by the knots and webs of the workpiece. The second sheet metal can thus in particular be the outer skin of a hood, of a fender or of a door of the vehicle, while the knots and webs form a reinforcement, which is hidden underneath the outer skin.

BRIEF DESCRIPTION OF THE DRAWINGS

The embodiments will hereinafter be described in conjunction with the following drawing figures, wherein like numerals denote like elements.

FIG. 9 shows a schematic section through a wall area of the workpiece directly after the molding;

FIG. 10 shows a section analogous to FIG. 9 after an immersion treatment;

FIG. 11 shows a top view onto a workpiece according to a sixth embodiment of the present disclosure, and FIG. 12 shows a section through the workpiece of FIG. 11.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
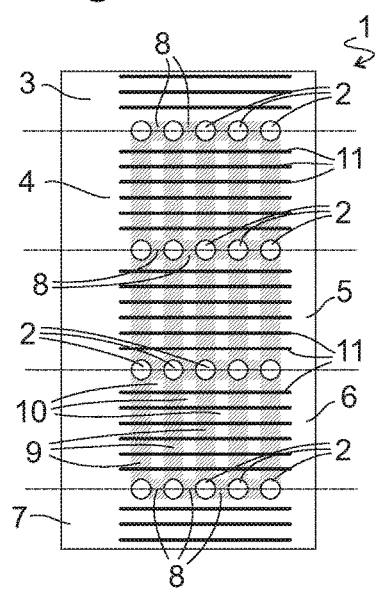
FIG. 1 shows a top view onto a prestage of a workpiece according to the present disclosure.

FIG. 1 shows a top view onto a cut 1 of steel or light sheet metal according to a first embodiment of the present disclosure. The cut 1, which is still flat in the shown treatment stage, is divided into sections 3 to 7 by four rows of openings 2, wherein the outer sections 3, 7 have the same width as the middle section 5, and the respective sections 4, 6 located therebetween also have the same width. Webs 8—highlighted in the figure by shading—connect sections 3 to 7, which are adjacent to one another, between two openings 2 of the same row. Each section can thus be perceived as a sequence of webs 9 and knots 10, which in each case extend between two openings 2 of different rows and on which two webs 8 and two webs 9 meet in each case. A layer 11, which includes a hardening addition that can be alloyed into the sheet metal, is applied to each section 3 to 7, here in the form of a plurality of strips, which cross the webs 9 and knots 10.

Figure 2:
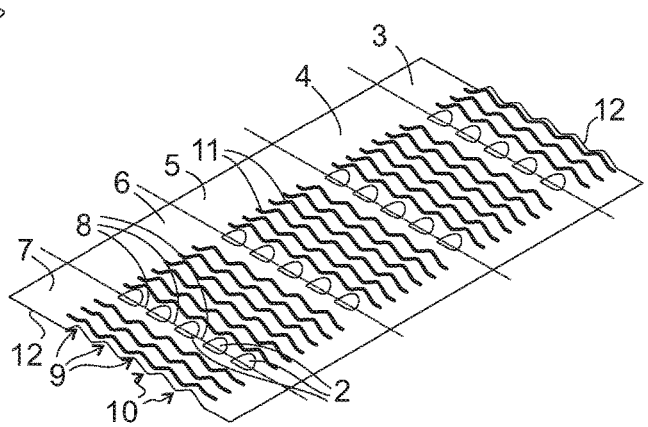
FIG. 2 shows the further treated prestage in a perspective view.

FIG. 2 shows the cut 1 in a perspective view after further treatment, in which wave contours have been rolled into the sections 3 to 7, so that the webs 9 are in each case deflected out of the plane of the knots 10 and the webs 8. The cut 1 furthermore runs straight along the rows of openings 2, so that the cut 1 can in each case be bent at right angles along these rows. The borders 12 of the sections 3 and 7, which then touch one another, can be welded to one another, so as to form a crash box in the form of an elongated cuboid, which is open on the front sides.

Figure 3:
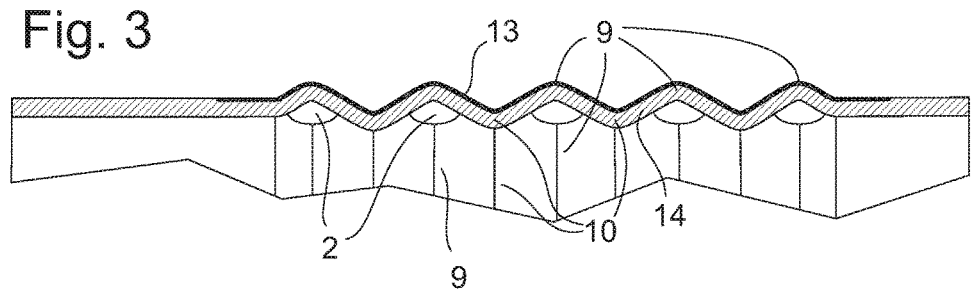
FIG. 3 shows a longitudinal section through the finished workpiece according to a first embodiment.

A heat treatment, in response to which the hardening addition of the layer 11 is alloyed into the cut 1, takes place at any point in time after the molding of the waves or simultaneously therewith. The heat treatment can include a local melting of the sheet metal surface, e.g. by a laser; in the alternative, the entire cut 1 can be heated, typically in a furnace, to just below the melting temperature. The hardened area 13 created thereby, which is shown in the longitudinal section through a wall of the crash box in FIG. 3, forms a layer on the surface of the sheet metal; an area 14 located therebelow remains free from the hardening addition.

The wave contour in the sections 3 to 7, which now form the side walls of the crash box, ensures a reproducible energy absorption behavior of the crash box in the event of a collision, because a wall section, which is parallel to the load effect, does not need to collaborate initially before the deformation occurs. Because of the openings 2, which are now located on the borders of the crash box, the collapsing sections of the longitudinal walls can shift outwards and do not interfere with one another. Due to the fact that bending lines, which cross one another and which are folded in respective opposite directions, are not created in response to the compression of the crash box, the crash box can be compressed across a distance, which is long as compared to its overall length and can thereby exhaust impact energy evenly. The hardened area 13 enlarges the energy dissipation capacity of the crash box while the sheet metal thickness remains the same.

Figure 4:
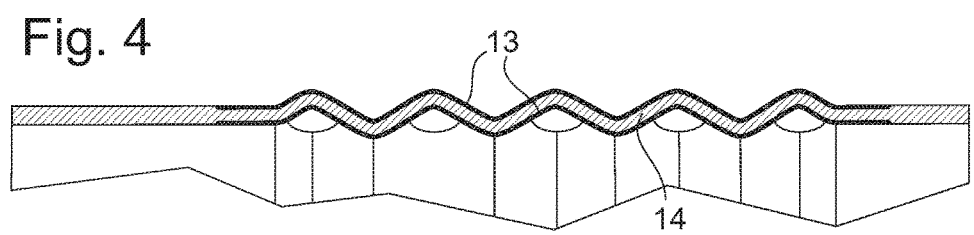
FIG. 4 shows a longitudinal section through the workpiece according to a second embodiment.

The energy dissipation capacity of the crash box can be increased in a particularly effective manner, when hardened areas 13, as shown in FIG. 4, are present on the outer as well as on the inner sides of the sections 3 to 7. To create such hardened areas on both sides of the cut 1, it is not necessary to apply the layer 11 on both sides. As is described in DE 10 2014 009 716 A1, it is sufficient to form a stack of a plurality of cuts, which are coated on one side, and to subject this stack as a whole to a heat treatment, so that the hardening addition of a layer 11 can expand into that cut 1, onto which the layer 11 is applied originally, as well as a second cut, which touches the layer 11 due to the stacking.

Figure 5:
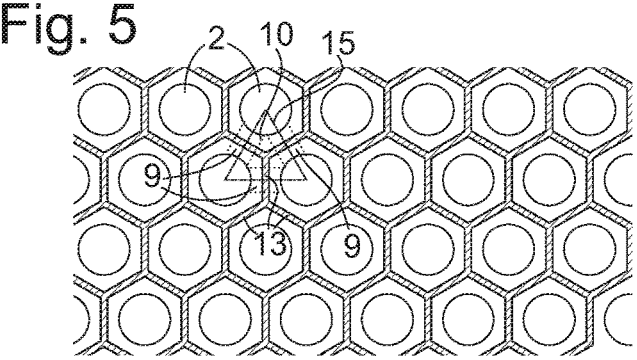
FIG. 5 shows a section of a workpiece according to a third embodiment in top view.

FIG. 5 shows a top view onto a sheet metal according to a second embodiment of the present disclosure. The openings 2 take up a significant part of the area of the sheet metal, here approx. 50%. They are arranged in a regular pattern; the centers of three adjacent openings 2 in each case form an equilateral triangle 15 here. The middle of the triangle 15 in each case forms a knot 10 here, at which three webs 9 meet. An elongated hardened area 13, which meets the hardened areas 13 of other webs 9 at the two knots 10, which are connected by the web 9, is formed on each web 9, so that together, the hardened areas 13 form a honeycomb structure.

The section shown in FIG. 5 can be part of an expanded sheet metal, which is wound as coil, for example, which is cut into individual workpieces for further treatment, which then have the structure shown in FIG. 5 across their entire expansion. The structure of FIG. 5, however, can also occupy up only a part of a workpiece, which is structured differently in other parts, for example along its edge, so as to facilitate the assembling with other workpieces, as will be explained in more detail at a later point on the basis of an example.

Figure 6:
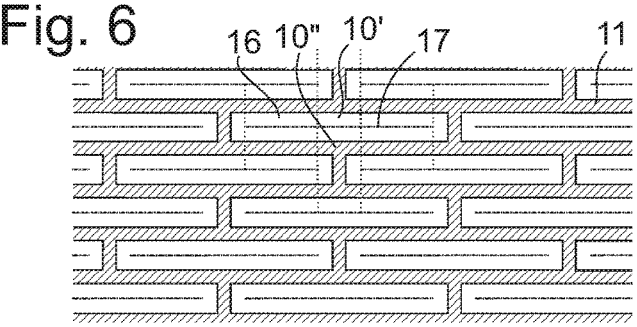
FIG. 6 shows a partial top view onto a prestage of the workpiece according to a fourth embodiment.

FIG. 6 shows a further example of a periodic structure, here in the form of a section of a sheet metal, to which the layer 11 has already been applied in the form of a grid including windows 16, while openings are not yet formed in the windows 16 of the layer 11. Here, the openings are created in that the sheet metal is in each case cut along the dashed lines 7 and two knots, identified in an exemplary manner with 10', 10" in FIG. 6, which, located opposite one another on both sides of the line 17, are deflected in opposite directions vertically to the plane of the sheet metal. An expanded metal structure is thus obtained, which has a rhombic opening at the location of each line 17. As in the case of FIG. 5, this expanded metal structure can be made as continuous material, which is broken down into individual workpieces, or it can be a one-piece part of a workpiece, which can additionally also include parts, which are structured differently.

Figure 7:
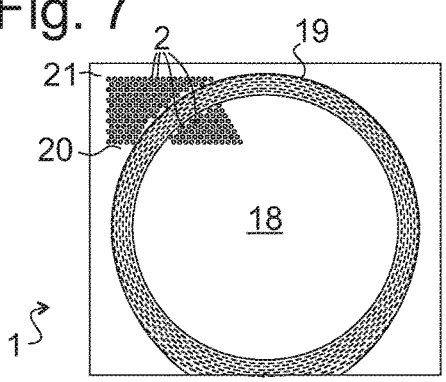
FIG. 7 shows a top view onto a prestage of a workpiece according to a fifth embodiment.
Figure 8:
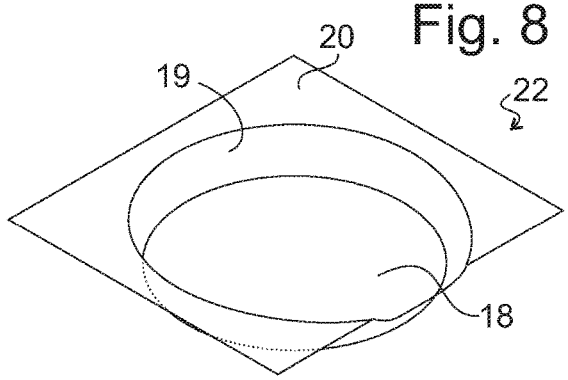
FIG. 8 shows a perspective view of the finished workpiece according to the fifth embodiment.

An example of a workpiece, in which the structures shown in FIGS. 5 and 6 are combined, is clarified in FIGS. 7 and 8.

FIG. 7 shows a top view onto a cut 1, which is provided to produce a spare wheel well for installation on the bottom of the cargo space of a motor vehicle. The cut 1 is divided into a circular central area 18, which is provided to form the bottom of the spare wheel well, a area 19, which extends around the central area 18 in a ring-shaped manner and which is to form side walls of the spare wheel well, and an outer area 20, which serves for fastening to longitudinal supports, adjacent bottom areas, etc. To save weight, the central area 18 as well as parts of the outer area 20 are embodied with a structure of the type shown in FIG. 5, as can be seen in the left upper corner of FIG. 7; an edge 21 of the outer area 20 remains free from openings 2, so as to facilitate the welding to other body parts. The ring-shaped area 19 has the expanded metal structure of FIG. 6. By expanding this area 19, the vertical offset between the areas 18, 20, which can be identified on the finished spare wheel well 22 of FIG. 8, can thus be realized easily. In spite of the reduced weight, the spare wheel well 22 obtains the required stability in that the hardening addition is alloyed during or after the expansion.

FIG. 9 shows a schematic section in radial direction through the area 19 after the expansion; the hardened area 13 and the unhardened area 14 can in each case be seen in the cut knots 10 as well as on the upper sides of the webs 9.

To make the spare wheel well 2 wind- and water-tight, it is immersed into a melt of a plastic, which, when the spare wheel well 22 is pulled out of the melt again, as shown in FIG. 10, adheres as layer 23 to the surface thereof and additionally forms a skin 24 in the openings of the area 19, which are formed in response to the expansion, and in the openings 2 of the areas 18, 20, which are not shown in FIG. 9 or 10, respectively.

As further exemplary embodiment of a workpiece according to the present disclosure, FIG. 11 shows a front hood reinforcement 30. The front hood reinforcement 30 has a grid structure, including a frame 25, which revolves on the outside, on the outer edge of which an outer skin 26 (see FIG. 12) of the front hood is fastened later, typically by beading. The frame 25 can e perceived as a sequence of webs 8 and knots 10, wherein webs 9, which start at the knots 10, divide the interior of the frame 25 into a plurality of openings 2. In the exemplary embodiment shown here, the webs 9 meet one another at a central knot 10; other arrangements are possible, e.g. those, in the case of which the webs 9 in each case connect two knots 10 of the frame 25 to one another, without crossing one another.

Across at least a part of their length, the webs 9 in each case have a hat-shaped cross section, as is shown in FIG. 12, including flanges 27 extending along the edges of the webs 9, which support the outer skin 26 directly or via an adhesive layer located therebetween, and a middle part 28, which is spaced apart from the outer skin 26.

Hardened areas 13 extend along the webs 9 at least in the middle part 28, in the illustration of FIG. 12 also in the flanges 27. Due to the vertical offset between the outer skin 26 and the middle part 28, in particular the hardened areas 13 of the middle part 28 contribute greatly to the bending strength of the webs 9. The hardened areas 13 of a plurality of webs 9 can meet one another on the central knot 10. Due to the fact that the hardened areas 13 extend only in longitudinal direction of the webs 9 here without crossing the flanges 27 with the side walls 29 of the webs, which connect the middle part 28, the hat profile of the webs 25 can also still be molded after alloying the hardening addition into the areas 13.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A workpiece comprising:
   a metal sheet having a plurality of knots and a plurality of webs formed therein;
   wherein each web extends between two openings from a first knot to a second knot and at least three webs meet at each knot; and
   wherein at least one of the plurality of the webs has a cross section with a hardened area forming an outer layer of the cross section, the hardened area layered on an underlying portion of the cross section, the hardened area having a hardness that is greater than the underlying portion.

2. The workpiece according to claim 1, wherein the metal sheet comprises a steel plate.

3. The workpiece according to claim 1, wherein the hardened area is one of a plurality of hardened areas that extend along the webs, wherein at least two of the plurality of hardened areas meet at the first knot, and wherein another two of the plurality of hardened areas meet at the second knot.

4. The workpiece according to claim 1, wherein the cross section includes an edge area that defines one of the two openings of the at least one web; and
   wherein the hardened area is spaced apart at a distance from the edge area.

5. The workpiece according to claim 1, wherein the hardened area is a first hardened area;
   wherein the cross section has a second hardened area that is layered on the underlying portion of the cross section;
   the first and second hardened areas forming two layers on opposite sides of the underlying portion; and
   the hardness of the second hardened area being greater than that of the underlying portion of the metal sheet.

6. The workpiece according to claim 1, wherein the hardened area comprises an alloyed hardened addition to the metal sheet.

7. The workpiece according to claim 1, wherein the metal sheet comprises a three-dimensionally formed part.

8. The workpiece according to claim 1, wherein the webs and knots are arranged in a periodic grid.

9. The workpiece according to claim 1, wherein the openings occupy at least half of the surface of the metal sheet.

10. The workpiece according to claim 1, further comprising a non-metallic skin covering the openings.

11. The workpiece according to claim 10, wherein the skin forms one piece layered across at least one surface of the knots and webs.

12. A vehicle body component selected from a group consisting of a spare wheel recess, a reinforcement for an outer metal sheet or a hood, wherein the vehicle body component comprises the workpiece according to claim 1.

13. The workpiece according to claim 1, wherein the hardened area forms a grid having windows in which the openings are located.

14. The workpiece according to claim 1, wherein the at least one web, in the cross section, includes a first edge and a second edge, the first edge partially defining a first opening and the second edge partially defining a second opening; and wherein the hardened area, in the cross section, is spaced apart at a distance from the first edge and the second edge.

15. The workpiece according to claim 14, wherein the hardened area is an elongate strip that extends along the at least one web.

16. The workpiece according to claim 15, wherein the hardened area is a melted and re-hardened portion of the metal sheet that is layered on the underlying portion of the cross section.

17. The workpiece according to claim 1, wherein the metal sheet includes a central area, a ring-shaped side wall area that extends around the central area, and an outer area that surrounds the ring-shaped side wall area; and the side wall area being an expanded structure to vertically offset the central area and the outer area.

18. The workpiece according to claim 17, wherein the plurality of knots and the plurality of webs are included in the central area and the side wall area;

wherein the hardened area is part of one of a plurality of hardened strips that are layered on the metal sheet across the central area and the side wall area;

wherein the openings in the central area are circular and arranged in offset rows;

wherein the hardened strips in the central area form a honeycomb structure;

wherein the openings in the side wall area are rhombic; and wherein an edge portion of the outer area is free of the plurality of openings.

19. A vehicle body component that defines a recess for a spare wheel comprising:

a metal sheet that includes a central area, a ring-shaped side wall area that extends around the central area, and an outer area that surrounds the ring-shaped side wall area, the central area forming a bottom of a spare wheel well, the side wall area forming side walls of the spare wheel well, the central area and the side wall area having a plurality of openings, a plurality of knots, and a plurality of webs formed therein;

a plurality of strips that are layered on the central area and the side wall area of the metal sheet, the plurality of strips having a hardness that is greater than that of the metal sheet; and a plastic skin that is layered on the metal sheet and that extends over the plurality of openings;

individual ones of the plurality of webs extending between two of the plurality of openings and spanning between neighboring pairs of the plurality of knots;

at least three of the plurality of webs meeting at a respective one of the plurality of knots;

the openings in the central area being circular and arranged in offset rows;

the strips in the central area forming a honeycomb structure;

the openings in the side wall area being rhombic;

the strips in the side wall area extending along ones of the plurality of knots and the plurality of webs; and an edge portion of the outer area being free of the plurality of openings.

20. The vehicle body component according to claim 19, wherein the plurality of strips comprise a melted and re-hardened portion of material of the metal sheet.

* * * * *